United States Patent
Gordon

(10) Patent No.: US 11,811,947 B2
(45) Date of Patent: Nov. 7, 2023

(54) SYSTEMS AND METHODS FOR COMMUNICATING DATA SECURELY FOR AN ELECTRIC POWER DELIVERY SYSTEM

(71) Applicant: Schweitzer Engineering Laboratories, Inc., Pullman, WA (US)

(72) Inventor: Colin Gordon, Katy, TX (US)

(73) Assignee: Schweitzer Engineering Laboratories, Inc., Pullman, WA (US)

( * ) Notice: Subject to any disclaimer, the term of this patent is extended or adjusted under 35 U.S.C. 154(b) by 330 days.

(21) Appl. No.: 17/462,246

(22) Filed: Aug. 31, 2021

(65) Prior Publication Data

US 2023/0066208 A1 Mar. 2, 2023

(51) Int. Cl.
*G06F 21/00* (2013.01)
*H04L 9/32* (2006.01)
*G06F 16/23* (2019.01)
*G06F 21/64* (2013.01)

(52) U.S. Cl.
CPC ........ *H04L 9/3242* (2013.01); *G06F 16/2379* (2019.01); *G06F 21/64* (2013.01)

(58) Field of Classification Search
CPC ....... H04L 9/3242; H04L 63/123; H04L 9/40; G06F 16/2379; G06F 21/64; Y04S 40/20
See application file for complete search history.

(56) References Cited

U.S. PATENT DOCUMENTS

| | | |
|---|---|---|
| 7,729,276 B2 | 6/2010 | Akyol |
| 2015/0163014 A1* | 6/2015 | Birrittella ............. H04L 1/1874 714/807 |
| 2019/0044954 A1* | 2/2019 | Kounavis ............. H04L 9/0631 |
| 2019/0116183 A1 | 4/2019 | Hussain |
| 2019/0173860 A1 | 6/2019 | Sankaran |
| 2019/0342101 A1 | 11/2019 | Hayes |
| 2020/0106719 A1 | 4/2020 | Acharya |

* cited by examiner

*Primary Examiner* — Jeffrey C Pwu
*Assistant Examiner* — William A Corum, Jr.
(74) *Attorney, Agent, or Firm* — Fletcher Yoder, P.C.

(57) ABSTRACT

An intelligent electronic device (IED) of an electric power delivery system includes processing circuitry a memory that includes instructions. The instructions, when executed by the processing circuitry, are configured to cause the processing circuitry to receive first data via parallel redundancy protocol (PRP), generate a first integrity check value using a media access control security (MACsec) integrity check function based on the first data, receive second data via PRP, generate a second integrity check value using the MACsec integrity function based on the second data, compare the first integrity check value and the second integrity check value with one another, and output a notification in response to determining that the first integrity check value and the second integrity check value do not match one another.

20 Claims, 4 Drawing Sheets

SYSTEMS AND METHODS FOR COMMUNICATING DATA SECURELY FOR AN ELECTRIC POWER DELIVERY SYSTEM

BACKGROUND

This disclosure relates to electric power delivery systems. More particularly, this disclosure relates to communicating data securely between devices of an electric power delivery system.

Electric power delivery systems carry electricity from a transmission system to residential communities, factories, industrial areas, and other electricity consumers. An electric power delivery system may include various intelligent electronic devices (IEDs) that may communicate with other devices of the electric power delivery system during operation of the electric power delivery system. For example, an IED may receive and/or transmit a signal and/or data in order to perform a functionality, such as to control a circuit breaker in response to electrical measurements of the electric power delivery system. Unfortunately, it may be difficult to communicate data securely as desired between IEDs. For example, multiple copies of the same data may be transmitted concurrently from one IED to another IED to increase the likelihood that the recipient IED receives the data. However, a copy of the data may be undesirably changed during transmission. As a result, the recipient IED may receive the changed data instead of the intended data and therefore may not operate as desired.

DETAILED DESCRIPTION

Figure 1:
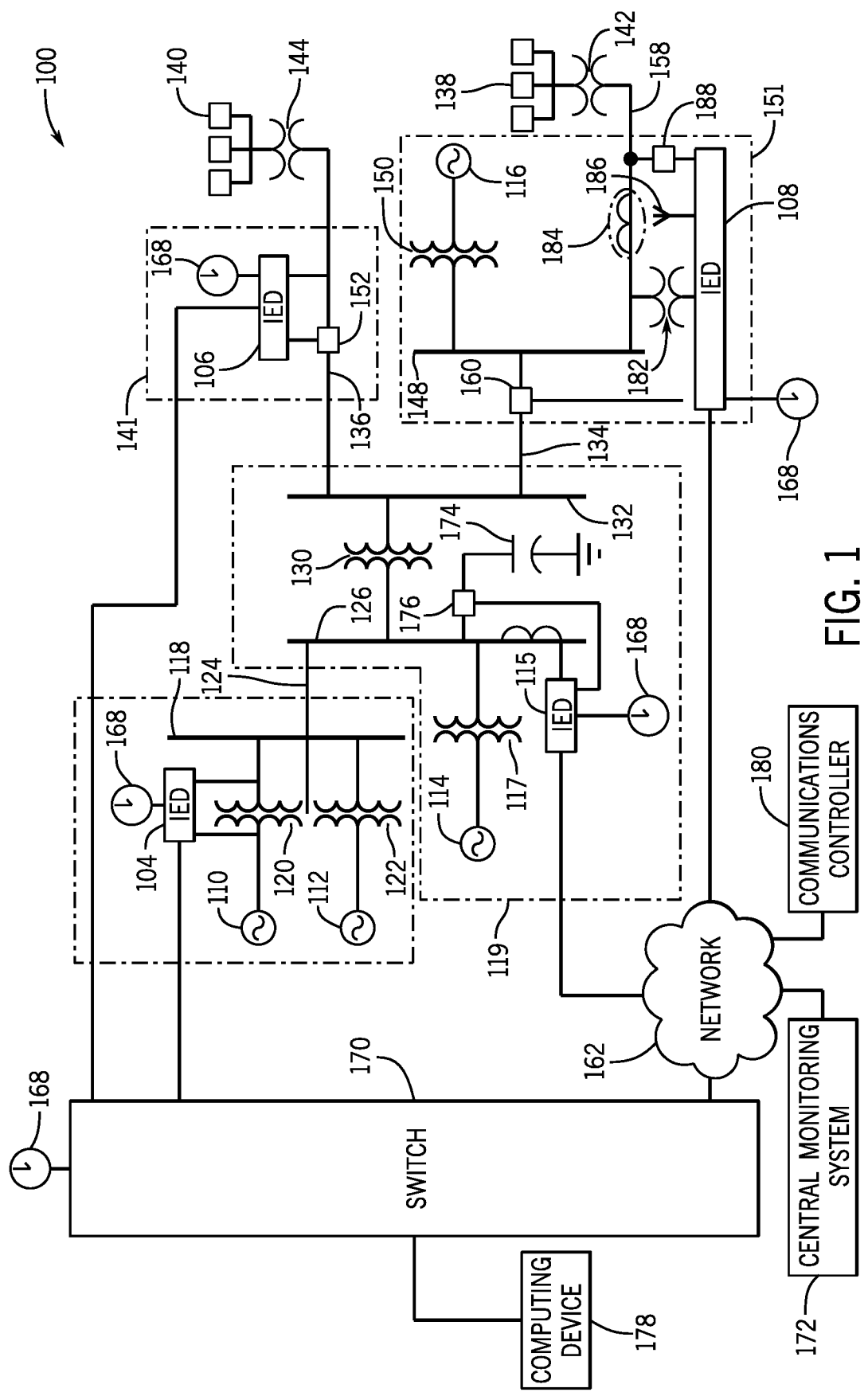
FIG. 1 is a schematic diagram of an electric power delivery system, in accordance with an aspect of the present disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be noted that references to "one embodiment" or "an embodiment" of the present disclosure are not intended to be interpreted as excluding the existence of additional embodiments that also incorporate the recited features. Furthermore, the phrase A "based on" B is intended to mean that A is at least partially based on B. Moreover, unless expressly stated otherwise, the term "or" is intended to be inclusive (e.g., logical OR) and not exclusive (e.g., logical XOR). In other words, the phrase "A or B" is intended to mean A, B, or both A and B.

Several aspects of the embodiments described may be implemented as software modules or components. As used herein, a software module or component may include any type of computer instruction or computer-executable code located within a memory device and/or transmitted as electronic signals over a system bus or wired or wireless network. A software module or component may, for instance, include physical or logical blocks of computer instructions, which may be organized as a routine, program, object, component, data structure, or the like, and which performs a task or implements a particular abstract data type.

In certain embodiments, a particular software module or component may include disparate instructions stored in different locations of a memory device, which together implement the described functionality of the module. Indeed, a module or component may include a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules or components may be located in local and/or remote memory storage devices. In addition, data being tied or rendered together in a database record may be resident in the same memory device, or across several memory devices, and may be linked together in fields of a record in a database across a network.

Embodiments may be provided as a computer program product including a tangible, non-transitory, computer-readable and/or machine-readable medium having stored thereon instructions that may be used to program a computer (or other electronic device) to perform processes described herein. For example, a non-transitory computer-readable medium may store instructions that, when executed by a processor of a computer system, cause the processor to perform certain methods disclosed herein. The non-transitory computer-readable medium may include, but is not limited to, hard drives, floppy diskettes, optical disks, compact disc read-only memories (CD-ROMs), digital versatile disc read-only memories (DVD-ROMs), read-only memories (ROMs), random access memories (RAMs), erasable programmable read-only memories (EPROMs), electrically erasable programmable read-only memories (EEPROMs), magnetic or optical cards, solid-state memory devices, or other types of machine-readable media suitable for storing electronic and/or processor executable instructions.

The present disclosure relates to communicating data securely between devices of an electric power delivery system or an electric power distribution system. Intelligent electronic devices (IEDs) may be used to control certain devices and to perform certain operations of the electric power delivery system. For example, an IED may be a relay that enables or blocks electrical power flow between other devices of the electric power delivery system. The IED may, for instance, communicate with a computing device, and the IED may operate based on the communication with the computing device (e.g., based on a user input). Furthermore, multiple IEDs may transmit data, such as operating information or sensor data, to one another to control various functions of devices of the electric power delivery system. As such, the IEDs may facilitate operation of the electric power delivery system.

Any of the IEDs may use parallel redundancy protocol (PRP) to communicate data. PRP enables copies of data to be communicated in parallel or concurrently with one another through respective data streams. During data transmission, PRP may be performed to copy data and cause the copies of the data to be transmitted through the respective data streams. During data receipt, PRP may be performed to receive multiple copies of data (e.g., data copied via a corresponding performance of PRP during transmission of the data), forward one of the copies of data (e.g., the copy of the data that was received first) for further processing, and discard remaining copies of data that are received. Performance of PRP may improve communication of data, such as the availability of data being communicated, between IEDs. For example, different sets of devices and components (e.g., switches, controllers) may operate to enable data transmission through the respective data streams for communicating data between IEDs. If a device associated with one of the data streams is unable to transmit data (e.g., operation of the device is faulty and/or suspended), data may still be transmitted via operation of the devices of another data stream to enable data to be communicated between IEDs despite one of the devices being unavailable.

Unfortunately, during transmission of multiple copies of data via PRP, one of the copies of data may be manipulated, modified, or otherwise changed in an undesirable manner. As an example, a faulty operation of a device associated with one of the data streams may cause a copy of the data to be changed during transmission. As another example, a third-party entity (e.g., a threat actor or other entity that is not a part of the electric power delivery system) may change a copy of the data during transmission. As a result, an IED may receive a copy of data that has been changed, and the IED may operate in an undesirable manner. That is, the IED may operate based on the data that has been changed instead of based on the data that was initially transmitted.

Accordingly, embodiments of the present disclosure relate to verifying copies of data that are being transmitted via PRP. For example, a recipient IED may generate a respective integrity check value for the copies of the data. In some embodiments, the integrity check value may be generated based on the information included in the data. Thus, copies of the same data (e.g., copies of data that include the same information) may be associated with the same integrity check value. However, if one of the copies of the data has been changed during transmission (e.g., the copies of data include different information), the integrity check value associated with the copy of the data may be different than the integrity check value associated with another copy of the data. For this reason, the IED may compare the integrity check values for the copies of the data with one another to determine whether a copy of the data has been changed during transmission. In response to determining that a copy of the data has been changed based on the comparison of integrity check values, the IED may perform an additional action to mitigate the impact of the data being changed, such as to block undesirable operation of the IED and therefore improve performance of the electric power delivery system.

In some embodiments, the integrity check value may be generated using media access control security (MACsec) related protocols. The MACsec related protocols may already be implemented for encrypting and decrypting data (e.g., copies of the same data) to communicate the data securely. However, the MACsec related protocols may also be used to generate the integrity check value based on the information included in the data for determining whether a copy of data has been changed. Indeed, functionalities used for securely communicating copies of data may also be used to generate the integrity check values for the copies of the data. As such, additional features or components (e.g., additional dedicated processing circuitry) may not be incorporated to generate the integrity check values, thereby reducing a cost and/or complexity associated with verifying copies of data.

With the preceding in mind, FIG. 1 is a schematic diagram of an electric power delivery system or an electric power distribution system 100 that may generate, transmit, and/or distribute electric energy to various loads (e.g., different structures). The electric power delivery system 100 may use various IEDs 104, 106, 108, 115 to control certain aspects of the electric power delivery system 100. As used herein, an IED (e.g., the IEDs 104, 106, 108, 115) may refer to any processing-based device that monitors, controls, automates, and/or protects monitored equipment within the electric power delivery system 100. Although the present disclosure primarily discusses the IEDs 104, 106, 108, 115 as relays, such as a remote terminal unit, a differential relay, a distance relay, a directional relay, a feeder relay, an overcurrent relay, a voltage regulator control, a voltage relay, a breaker failure relay, a generator relay, and/or a motor relay, additional IEDs 104, 106, 108, 115 may include an automation controller, a bay controller, a meter, a recloser control, a communications processor, a computing platform, a programmable logic controller (PLC), a programmable automation controller, an input and output module, and the like. Moreover, the term IED may be used to describe an individual IED or a system including multiple IEDs.

For example, the electric power delivery system 100 may be monitored, controlled, automated, and/or protected using the IEDs 104, 106, 108, 115, and a central monitoring system 172 (e.g., an industrial control system). In general, the IEDs 104, 106, 108, 115 may be used for protection, control, automation, and/or monitoring of equipment in the electric power delivery system 100. For example, the IEDs 104, 106, 108, 115 may be used to monitor equipment of many types, including electric power lines, electric power lines, current sensors, busses, switches, circuit breakers, reclosers, transformers, autotransformers, tap changers, voltage regulators, capacitor banks, generators, motors, pumps, compressors, valves, and a variety of other suitable types of monitored equipment.

A common time signal may be distributed throughout the electric power delivery system 100. Utilizing a common time source may ensure that IEDs 104, 106, 108, 115 have a synchronized time signal that can be used to generate time synchronized data, such as synchrophasors. In various embodiments, the IEDs 104, 106, 108, 115 may receive a common time signal 168. The time signal may be distributed in the electric power delivery system 100 using a communications network 162 and/or using a common time source, such as a Global Navigation Satellite System ("GNSS"), or the like.

The IEDs 104, 106, 108, 115 may be used for controlling various other equipment of the electrical power delivery system 100. By way of example, the illustrated electric power delivery system 100 includes electric generators 110, 112, 114, 116 and power transformers 117, 120, 122, 130, 142, 144, 150. The electric power delivery system 100 may also include electric power lines 124, 134, 136, 158 and/or busses 118, 126, 132, 148 to transmit and/or deliver power, circuit breakers 152, 160, 176 to control flow of power in the electric power delivery system 100, and/or loads 138, 140 to receive the power in and/or from the electric power delivery system 100. A variety of other types of equipment may also be included in the electric power delivery system 100, such as a voltage regulator, a capacitor (e.g., a capacitor 174), a potential transformer (e.g., a potential transformer 182), a current sensor (e.g., a wireless current sensor (WCS) 184), an antenna (e.g., an antenna 186), a capacitor banks (e.g., a capacitor bank (CB) 188), and other suitable types of equipment useful in power generation, transmission, and/or distribution.

A substation 119 may include the electric generator 114, which may be a distributed generator and which may be connected to the bus 126 through the power transformer 117 (e.g., a step-up transformer). The bus 126 may be connected to the bus 132 (e.g., a distribution bus) via the power transformer 130 (e.g., a step-down transformer). Various electric power lines 136, 134 may be connected to the bus 132. The electric power line 136 may lead to a substation 141 in which the electric power line 136 is monitored and/or controlled using the IED 106, which may selectively open and close the circuit breaker 152. The load 140 may be fed from the electric power line 136, and the power transformer 144 (e.g., a step-down transformer) in communication with the bus 132 via electric power line 136 may be used to step down a voltage for consumption by the load 140.

The electric power line 134 may deliver electric power to the bus 148 of the substation 151. The bus 148 may also receive electric power from the distributed electric generator 116 via the power transformer 150. The electric power line 158 may deliver electric power from the bus 148 to the load 138 and may include the power transformer 142 (e.g., a step-down transformer). The circuit breaker 160 may be used to selectively connect the bus 148 to the electric power line 134. The IED 108 may be used to monitor and/or control the circuit breaker 160 as well as the electric power line 158.

According to various embodiments, the central monitoring system 172 may include one or more of a variety of types of systems. For example, the central monitoring system 172 may include a supervisory control and data acquisition (SCADA) system and/or a wide area control and situational awareness (WACSA) system. A switch 170 may be in communication with the IEDs 104, 106, 108, 115. The IEDs 104, 106, 108, 115 may be remote from the switch 170 and may communicate over various media. For instance, the switch 170 may be directly in communication with the IEDs 104, 106 and may be in communication with the IEDs 108, 115 via the communications network 162.

The switch 170 may enable or block data flow between any of the IEDs 104, 106, 108, 115. For example, during operation of the electric power delivery system 100, the IEDs 104, 106, 108, 115 may transmit data with one another to perform various functionalities for the electric power delivery system 100 by initially transmitting the data to the switch 170. The switch 170 may receive the data and may subsequently transmit the data to an intended recipient of the data. The switch 170 may also control data flow between one of the IEDs 104, 106, 108, 115 and another device communicatively coupled to the switch 170, such as a computing device 178. For instance, the computing device 178 may be a laptop, a mobile phone, a desktop, a tablet, or another suitable device with which a user (e.g., a technician, an operator) may interact. As such, the user may utilize the computing device 178 to receive data, such as operating data, from the electric power delivery system 100 via the switch 170 and/or to send data, such as a user input, to the electric power delivery system 100 via the switch 170. Thus, the switch 170 may enable or block operation of the electric power delivery system 100 via the computing device 178.

A communications controller 180 may interface with equipment in the communications network 162 to create a software-defined network that facilitates communication between the switch 170, the IEDs 104, 106, 108, 115, and/or the central monitoring system 172. In various embodiments, the communications controller 180 may interface with a control plane (not shown) in the communications network 162. Using the control plane, the communications controller 180 may direct the flow of data within the communications network 162. Indeed, the communications controller 180 may communicate with the switch 170 to instruct the switch 170 to transmit certain data (e.g., data associated with a certain set of characteristics or information) to a particular destination (e.g., an intended recipient) using flows, matches, and actions defined by the communications controller 180.

In some embodiments, the switch 170 and the IEDs 104, 106, 108, 115 may communicate with one another via a MACsec communication link or channel and/or a MACsec key agreement (MKA) connectivity association. An MKA protocol may be used to establish the MACsec communication link. During the MKA protocol, the switch 170 or another key server (e.g., a controller, an IED) may select a connectivity association key (CAK) from a set of keys (e.g., a generated set of keys, a received set of keys) and distribute the CAK or a copy of the CAK to an IED via an adoption link (e.g., an Ethernet link, a pre-stored MKA link) established between the switch 170 and the IED. An MKA connectivity association may be established between the IED and the switch 170 based on verification that the IED possesses the CAK. The switch 170 may then select a security association key (SAK) from the set of the keys for distribution to the IED via the MKA connectivity association. The switch 170 may retain a copy of the same SAK, and the IED may use its copy of the SAK to establish a MACsec communication link for communicating data. Indeed, the switch 170 and the IED may use copies of the same SAK to encrypt data to be transmitted as well as to decrypt encrypted data that has been received. Such encrypted data may be transmitted via the MACsec communication link established between the devices to communicate the data securely.

Additionally, the switch 170 and the IEDs 104, 106, 108, 115 may communicate with one another using PRP. For example, data to be transmitted by one of the IEDs 104, 106, 108, 115 may be copied via PRP, and the copies of the data may be transmitted through respective data streams. Another one of the IEDs 104, 106, 108, 115 may receive the copies of the data and may forward one of the copies of the data (e.g., the copy of the data that was received first) via PRP for further processing. In this manner, if the IED does not receive data being transmitted through one of the data streams (e.g., a device is not successfully operating to transmit data through one of the data streams), the IED may still be able to receive data being transmitted through another data stream. In some embodiments, an IED may perform an integrity check on copies of data generated via PRP to determine whether any of the copies of data have been changed during transmission. For example, the integrity check may generate respective integrity check values based on the information, such as parameter values, operating information, and so forth, included in the copies of data. Thus, each copy of data may be associated with a respective integrity check value. The TED may then compare the integrity check values with one another. If the information included in a copy of the data has been changed, the generated integrity check values may not match with one another. As such, the IED may determine whether a copy of the data has been changed based on whether the integrity check values match one another. In response to determining that the copies of data are unchanged, the TED may operate normally to process a copy of the data for further operation.

However, in response to determining that a copy of the data has been changed, the IED may perform an additional action to mitigate the impact of the changed data on the operation of the electric power delivery system 100.

Figure 2:
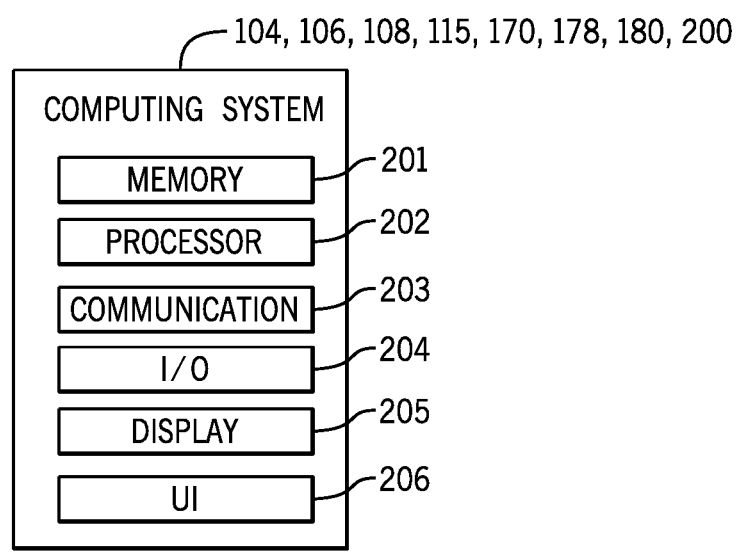
FIG. 2 is a schematic diagram of a computing system that may be incorporated in a device of an electric power delivery system, in accordance with an aspect of the present disclosure.

FIG. 2 is a schematic diagram of an embodiment of a computing system 200 that may be incorporated within a device of the electric power delivery system 100, such as in any of the IEDs 104, 106, 108, 115, the switch 170, the computing device 178, and/or the communications controller 180. The computing system 200 may include a memory 201 and a processor or processing circuitry 202. The memory 201 may include a non-transitory computer-readable medium that may store instructions that, when executed by the processor 202, may cause the processor 202 to perform various methods described herein. To this end, the processor 202 may be any suitable type of computer processor or microprocessor capable of executing computer-executable code, including but not limited to one or more field programmable gate arrays (FPGA), application-specific integrated circuits (ASIC), programmable logic devices (PLD), programmable logic arrays (PLA), and the like. The processor 202 may, in some embodiments, include multiple processors.

The computing system 200 may also include a communication system 203, which may include a wireless and/or wired communication component to establish a communication link with another device of the electric power delivery system 100. That is, the communication system 203 enables the computing system 200 (e.g., of one of the IEDs 104, 106, 108, 115) to communication with another communication system 203 of another computing system 200 (e.g., of the switch 170). Indeed, the communication system 203 may include any suitable communication circuitry for communication via a personal area network (PAN), such as Bluetooth or ZigBee, a local area network (LAN) or wireless local area network (WLAN), such as an 802.11x Wi-Fi network, and/or a wide area network (WAN), (e.g., third-generation (3G) cellular, fourth-generation (4G) cellular, near-field communications technology, universal mobile telecommunication system (UMTS), long term evolution (LTE), long term evolution license assisted access (LTE-LAA), fifth-generation (5G) cellular, and/or 5G New Radio (5G NR) cellular). The communication system 203 may also include a network interface to enable communication via various protocols such as EtherNet/IP®, ControlNet®, DeviceNet®, or any other industrial communication network protocol.

Additionally, the computing system 200 may include input/output (I/O) ports 204 that may be used for communicatively coupling the computing system 200 to an external device. For example, the I/O ports 204 of the computing system 200 of the switch 170 may communicatively couple to corresponding I/O ports 204 of the computing system 200 of the computing device 178. The computing system 200 may further include a display 205 that may present any suitable image data or visualization. Indeed, the display 205 may present image data that includes various information regarding the electric power delivery system 100, thereby enabling the user to observe an operation, a status, a parameter, other suitable information, or any combination thereof, of the electric power delivery system 100. Further still, the computing system 200 may include a user interface (UI) 206 with which the user may interact to control an operation of the computing system 200. For instance, the UI 206 may include a touch screen (e.g., as a part of the display 205), an eye-tracking sensor, a gesture (e.g., hand) tracking sensor, a joystick or physical controller, a button, a knob, a switch, a dial, a trackpad, a mouse, another component, or any combination thereof. As an example, the user may utilize the UI 206 of the computing system 200 of the computing device 178 to transmit data to the switch 170.

Figure 3:
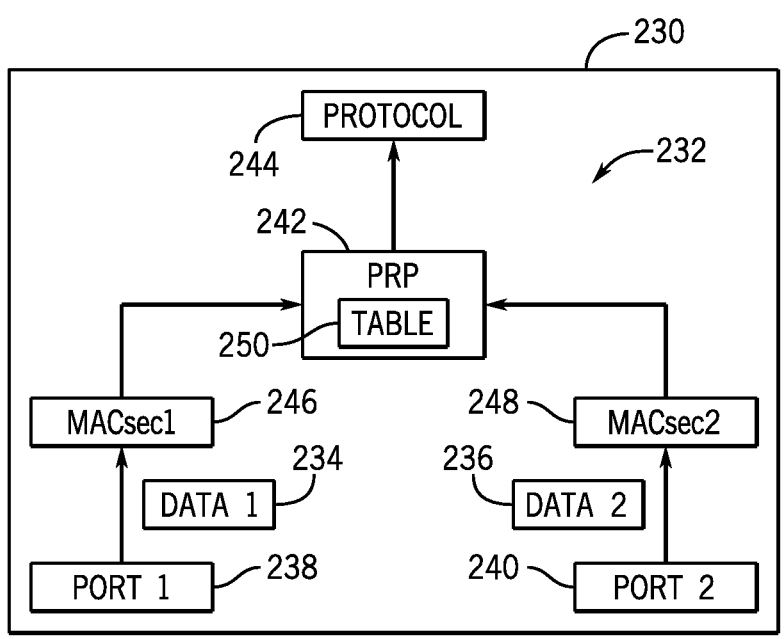
FIG. 3 is a schematic diagram of control circuitry of an IED for communicating data for an electric power delivery system, in accordance with an aspect of the present disclosure.

FIG. 3 is a schematic diagram of an embodiment of an IED 230 (e.g., any of the IEDs 104, 106, 108, 115) that includes control circuitry 232 for communicating data through the electric power delivery system 100. The control circuitry 232 may enable PRP functionalities to enable communication of copies of the same data. During data receipt or ingress by the IED 230, in which the IED 230 may receive data (e.g., a data packet, a data frame), the IED 230 may receive a first copy of data 234 and a second copy of data 236 from another device, such as another IED. The first and second copies of data 234, 236 may be associated with the same data copied via PRP (e.g., PRP control circuitry associated with the other device). For example, the first copy of the data 234 may be transmitted to the IED 230 via a first data stream, and the second copy of the data 236 may be transmitted to the IED 230 via a second data stream.

The IED 230 may receive the first copy of the data 234 via a first port 238 (e.g., a first Ethernet port) and the second copy of the data 236 via a second port 240 (e.g., a second Ethernet port). A PRP function block 242 (e.g., PRP control circuitry, a PRP link redundancy entity) may receive each of the copies of the data 234, 236 via the ports, 238, 240, respectively. The PRP function block 242 may forward or transmit one of the first or second copies of the data 234, 236 to a protocol function block 244 (e.g., protocol control circuitry) of the IED 230 for further processing, and the PRP function block 242 may discard the other of the first or second copies of the data 234, 236. By way of example, each of the first and second copies of the data 234, 236 may be associated with an identifier (e.g., a sequence number provided by a PRP function block of the transmitting device when copying the data). The PRP function block 242 may determine whether one of the copies of the data 234, 236 has been forwarded to the protocol function block 244 based on the identifiers. For instance, the PRP function block 242 may initially receive the first copy of the data 234, determine that, based on the identifier associated with the first copy of the data 234, the first copy of the data 234 is a copy of data that has not yet been forwarded to the protocol function block 244, and forward the first copy of the data 234 to the protocol function block 244 in response. The PRP function block 242 may subsequently receive the second copy of the data 236, determine that, based on the identifier associated with the second copy of the data 236 (e.g., indicating that the sequence number associated with the second copy of the data 236 matches with the sequence number associated with the first copy of the data 234), the second copy of the data 236 is a copy of data associated with the first copy of the data 234 that has already been forwarded to the protocol function block 244, and discard the second copy of the data 236 in response rather than forward the second copy of the data 236 to the protocol function block 244. Thus, the PRP function block 242 may block the protocol function block 244 from receiving duplicate copies of the same data transmitted by the other device, such as by forwarding a copy of the data that was received first.

Upon receipt of either the first or second copy of the data 234, 236, the protocol function block 244 may process the received data in accordance to a protocol (e.g., Simple Network Time Protocol, Distributed Network Protocol, Telnet, Modbus Transmission Control Protocol, File Transfer Protocol). The TED 230 may then operate based on the processed data. In this manner, PRP may increase the likelihood of the IED 230 receiving data for operation. That is, if the IED 230 does not receive one of the first or second copies of the data 234, 236 (e.g., due to a faulty operation during transmission through the associated data stream), the IED 230 may still receive the other of the first or second copies of the data 234, 236 and operate based on the received data.

In certain embodiments, the IED 230 may also perform PRP operations during data transmission or egress, in which the IED 230 may transmit data (e.g., a data packet, a data frame). For example, the protocol function block 244 may process data and forward or transmit the processed data to the PRP function block 242. The PRP function block 242 may copy the data to create two separate copies of the data along with respective identifiers, which may include a redundancy check trailer that indicates the copies are of the same data and that associates the copies of the data with their respective data streams. The PRP function block 242 may then transmit the copies of the data via the respective ports 238, 240 to another device of the electric power delivery system 100, such as for further processing by the other device via a corresponding PRP operation.

During data ingress, the control circuitry 232 of the IED 230 may also determine whether the copies of the data 234, 236 include the same information to determine whether a copy of the data 234, 236 may have been changed or modified during transmission to the IED 230. To this end, the control circuitry 232 may generate a respective integrity check value (e.g., a respective MACsec integrity check value, a respective GHASH, a respective MACsec cryptographic hash) for each of the copies of the data 234, 236. In the illustrated embodiment, the control circuitry 232 includes a first MACsec function block 246 and a second MACsec function block 248, which may be implemented in a physical layer (e.g., an Ethernet physical layer) of the control circuitry 232. The first MACsec function block 246 may operate MACsec integrity check functions (e.g., silent cache checking functions) to generate a first integrity check value (e.g., a first MACsec integrity check value, a first GHASH, a first MACsec cryptographic hash) for the first copy of the data 234 based on information included in the first copy of the data 234. The second MACsec function block 248 may operate MACsec integrity check functions to generate a second integrity check value (e.g., a second MACsec integrity check value, a second GHASH, a second MACsec cryptographic hash) for the second copy of the data 236 based on information included in the second copy of the data 236. For example, the redundancy check trailers may be removed from the copies of the data 234, 236, and the MACsec function blocks 246, 248 may generate the respective integrity check values based on a remainder of the information included in the copies of the data 234, 236 (e.g., information that is not included in the respective redundancy check trailers of the copies of the data 234, 236). The PRP function block 242 may receive the respective integrity check values along with the copies of the data 234, 236 from the MACsec function blocks 246, 248, respectively. Although the present disclosure primarily discusses the use of MACsec integrity check functions to generate the integrity check values, any suitable cryptographic integrity check functions may be used to generate the integrity check values based on the information included in the copies of the data 234, 236.

In certain embodiments, the integrity check values may be generated based on the format of the copies of the data 234, 236. As an example, for data that has been encrypted via MACsec (e.g., via a SAK) prior to receipt by the IED 230, the data may be decrypted (e.g., into plaintext format), such as via the MACsec function blocks 246, 248, and the integrity check value may be generated after decryption of the data. As another example, for data that has not been encrypted via MACsec prior to receipt by the IED 230 (e.g., the data is already in plaintext format), the integrity check value may be generated without having to decrypt the data. In this manner, the integrity check value may be generated based on data that is not encrypted via MACsec. As a further example, for data that is unencrypted, the data may initially be encrypted (e.g., via the MACsec function blocks 246, 248) to generate the integrity check values.

The first MACsec function block 246 and the second MACsec function block 248 may generate the same integrity check value based on the same information being included in the copies of the data 234, 236. Accordingly, copies of the data 234, 236 that have not been modified (e.g., copies of the data 234, 236 including the same information) may be associated with the same integrity check value. However, changing the information in one of the copies of the data 234, 236, thereby causing the information included in the copies of the data 234, 236 to be different from one another) will cause different integrity check values to be generated for the respective copies of the data 234, 236. For this reason, the integrity check values generated for the copies of the data 234, 236 may be compared with one another to determine whether one of the copies of the data 234, 236 may have been changed during transmission to the IED 230.

In some embodiments, the PRP function block 242 may compare the integrity check values for the received copies of the data 236, 238 during data ingress. For example, the PRP function block 242 may receive the first copy of the data 234 and generate the first integrity check value for the first copy of the data 234. The PRP function block 242 may also determine that the first copy of the data 234 is associated with initial data based on an identifier of the first copy of the data 234 and forward the first copy of the data 234 to the protocol function block 244 in response to a determination that a copy of such initial data has not yet been forwarded to the protocol function block 244. The PRP function block 242 may subsequently receive the second copy of the data 236 and generate the second integrity check value for the second copy of the data 236. The PRP function block 242 may determine that the second copy of the data 236 is associated with the same initial data based on an identifier of the second copy of the data 236 and therefore compare the second integrity check value and the first integrity check value with one another.

In response to a determination that the first and second integrity check values match or are equal to one another (e.g., to indicate that the copies of the data 234, 236 have not been changed during transmission), the IED 230 may operate normally, such as without adjusting operation of the IED 230 to mitigate operation based on the copies of the data 234, 236. For example, IED 230 may operate based on the first copy of the data 234 processed by the protocol function block 244, and the PRP function block 242 may discard the second copy of the data 236. In additional or alternative embodiments, the IED 230 may output a notification or other indication in response to a determination that the first and second integrity check values match one another, such as to indicate that the IED 230 is operating as desired.

In response to a determination that the first and second integrity check values do not match or are not equal to one another (e.g., to indicate that one of the copies of the data 234, 236 has been changed during transmission), the IED 230 may perform a different action. For instance, the IED 230 may output a notification to inform a user (e.g., an operator, a technician) that the copies of the data 234, 236 are different from one another, and/or the IED 230 may block subsequent receipt of data (e.g., from the device that transmitted the copies of the data 234, 236) to block undesirable operation based on data that has been changed, thereby mitigating undesirable performance of the electric power delivery system 100. In some embodiments, operation of the IED 230 may be blocked based on either copy of the data 234, 236 in response to a determination that the copies of the data 234, 236 are different from one another. For example, after one of the copies of the data 234, 236 has been forwarded via the PRP function block 242 and/or processed via the protocol function block 244, the operation of the IED 230 may be blocked until the integrity check values for the copies of the data 234, 236 have been compared to one another. In response to a determination that the integrity check values match or are equal to one another, the IED 230 (e.g., the protocol block 244) may then operate based on the copy of the data 234, 236 that has been forwarded and processed. In response to a determination that the integrity check values are different from one another, the IED 230 (e.g., the protocol block 244) may block operation based on the copy of the data 234, 236 that has been forwarded and processed, such as until the discrepancy of integrity check values has been addressed.

The PRP function block 242 may access and/or include a table 250 (e.g., a PRP node table), such as a database table or a lookup table, in some embodiments for comparing integrity check values to one another. The PRP function block 242 may update the table 250 to associate copies of the data 234, 236 with the generated integrity check values. For instance, after receiving and processing the first copy of the data 234, the PRP function block 242 may update the table 250 to indicate that the first copy of the data 234 was received via the first port 238 and is associated with particular initial data and a first integrity check value. After receiving and processing the second copy of the data 236, the PRP function block 242 may update the table 250 to indicate that the second copy of the data 236 was received via the second port 240 and is associated with the particular initial data and a second integrity check value. The PRP function block 242 may then use the table 250 to compare the integrity check values with one another. In certain embodiments, the PRP function block 242 may also update the table 250 to indicate other information, such as to associate devices with different networks or protocols, to indicate whether a device is using PRP, and so forth. In this way, the table 250 may facilitate operation of the PRP function block 242 to operate based on data to be communicated.

Figure 4:
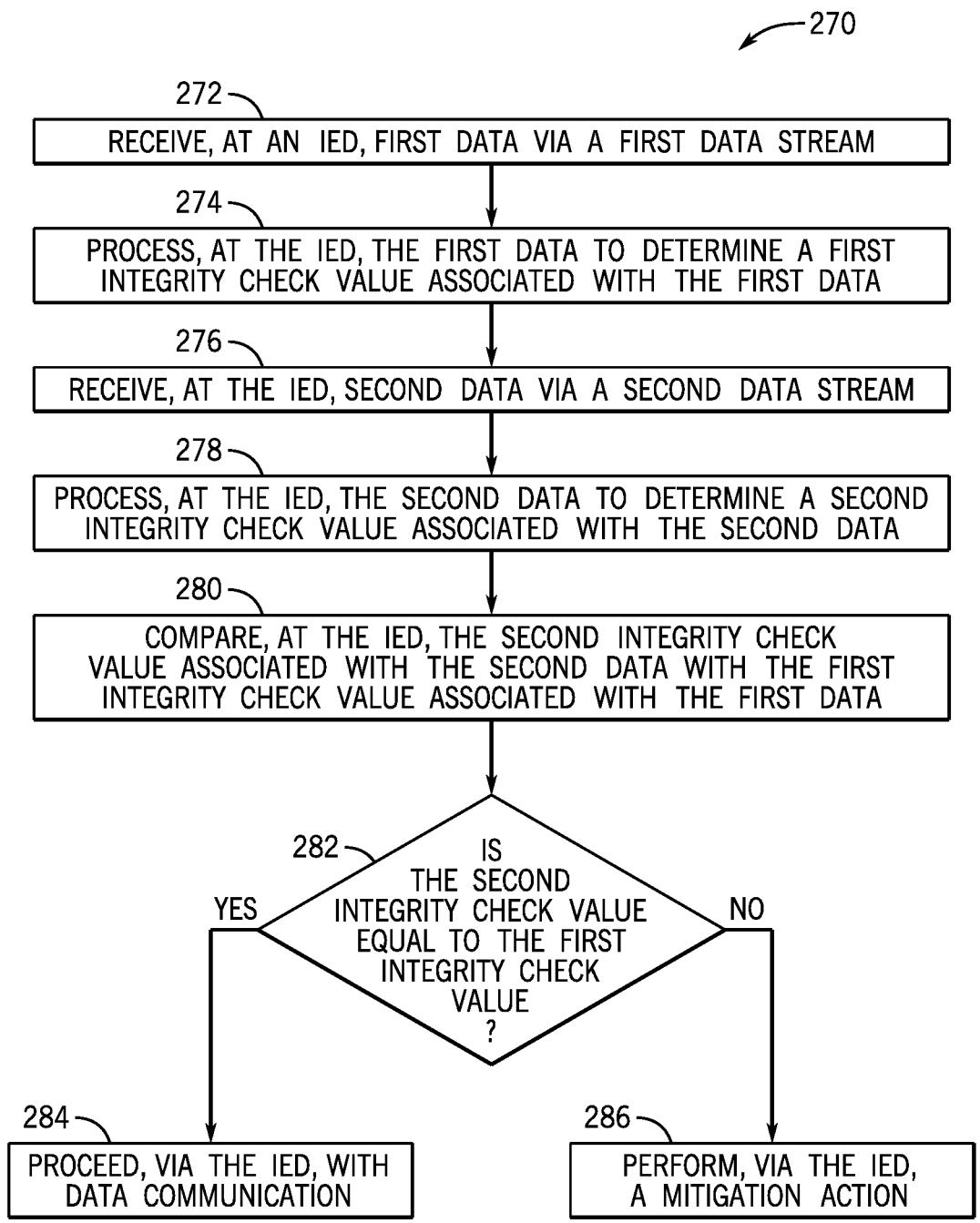
FIG. 4 is a flowchart of a method for communicating data for an electric power delivery system, in accordance with an aspect of the present disclosure.

FIG. 4 is a flowchart of an embodiment of a method 270 for verifying integrity check values of copies of data transmitted via PRP. In some embodiments, the method 270 may be performed by a single respective component or system, such as by the computing system 200 (e.g., the processor 202) of the IED 230 (e.g., the PRP function block 242). In additional or alternative embodiments, multiple components or systems may perform the procedures for the method 270. It should also be noted that additional procedures may be performed with respect to the method 270. Moreover, certain procedures of the depicted method 270 may be removed, modified, and/or performed in a different order.

At block 272, the IED 230 may receive first data from a device via a first data stream, such as data transmitted from a first network (e.g., a first local area network) to the first port 238 of the IED 230. For example, the first data may be a copy of initial data generated via performance of a corresponding PRP for subsequent transmission to the IED 230 via the first data stream. The first data may include various information, such as parameter values, operating data, an identifier (e.g., a sequence number of a redundancy check trailer added to the first data) to indicate association with the initial data, and the like, that may be used by the IED 230 to operate accordingly.

At block 274, the IED 230 may process the first data to determine a first integrity check value associated with the first data. For example, the IED 230 may use MACsec integrity check functions (e.g., via the first MACsec function block 246) to generate the first integrity check value based on the information included in the first data (e.g., after extracting the redundancy check trailer from the first data). In some embodiments, the IED 230 may decrypt the first data (e.g., via the first MACsec function block 246) before generating the first integrity check value, such as by using a SAK to decrypt a MACsec encryption of the first data and changing the first data into plaintext format. In additional or alternative embodiments in which the first data is unencrypted, the IED 230 may encrypt the first data to obtain the first integrity check value. In certain embodiments, the IED 230 may also update a table (e.g., the table 250) to associate the first data with the first integrity check value.

At block 276, the IED 230 may receive second data from the device via a second data stream, such as data transmitted from a second network (e.g., a second local area network) to the second port 240 of the IED 230. The second data may be a copy of the same initial data used to generate the first data received by the IED 230. The second data may also include information, such as parameter values, operating data, and an identifier that indicates association with the same data (e.g., the sequence number of the redundancy check trailer added to the second data matching the sequence number of the redundancy check trailer added to the first data), and the like.

At block 278, the IED 230 may process the second data to determine a second integrity check value associated with the second data. For instance, the IED 230 may also use MACsec integrity check functions (e.g., via the second MACsec function block 248) to generate the second integrity check value based on the information included in the second data (e.g., after extracting the redundancy check trailer from the second data). The IED 230 may also decrypt the second data (e.g., via the second MACsec function block 248) prior to generating the second integrity check value. In embodiments in which the second data is unencrypted, the IED 230 may encrypt the second data to obtain the second integrity check value. The IED 230 may also update the table to associate the second data with the second integrity check value.

At block 280, the IED 230 may compare the second integrity check value associated with the second data with the first integrity check value associated with the first data. By way of example, based on the table, the IED 230 may determine that the first data and the second data are copies of the same data. For instance, the IED 230 may determine that the first data and the second data are copies of the same initial data as indicated by the respective identifiers of the first data and the second data. In response, the IED may compare the first integrity check value and the second integrity check value with one another.

At block 282, the IED 230 may determine whether the first integrity check value and the second integrity check value match one another. In some embodiments, if the first data and the second data remain unchanged during transmission to the IED 230, each of the first data and the second data may include the same information, and each of the first integrity check value and the second integrity check value should therefore match one another. However, if the first data and/or the second data changes during transmission to the IED 230, the first data and the second data may include different information. Therefore, the first integrity check value and the second integrity check value may not match one another. As such, the IED 230 may compare the first integrity check value and the second integrity check value to determine whether one of the first data or the second data may have changed during transmission.

At block 284, in response to determining that the first integrity check value and the second integrity check value match one another, the IED 230 may proceed with data communications (e.g., and block output of a notification indicative that the integrity check values do not match one another). That is, the IED 230 may determine that neither the first data nor the second data has been changed during transmission, and the IED 230 may continue to operate based on the data received from the device. For example, the IED 230 may have received the first data prior to receiving the second data and determined (e.g., based on the identifier associated with the first data) that the first data is a copy of data that has not yet been forwarded to the protocol function block 244 for further processing. Therefore, the IED 230 (e.g., the PRP function block 242) may forward the first data to the protocol function block 244 in response. The protocol function block 244 may then process the first data and cause the IED 230 to operate based on the processed first data. The IED 230 may subsequently receive the second data, determine (e.g., based on the identifier associated with the second data) that the second data is a copy of the same data as that of the first data. The IED 230 may therefore discard the second data in response to determining that the first data has already been forwarded to the protocol function block 244 for processing. That is, the IED 230 (e.g., the PRP function block 242) may block the protocol function block 244 from receiving the second data.

However, in response to a determination that the first integrity check value and the second integrity check value are different from one another, at block 286, the IED 230 may perform an action to mitigate the impact of the discrepancy between the first data and the second data. That is, the discrepancy between the first data and the second data may indicate that at least one of the first data or the second data has changed during transmission to the IED 230. As such, the IED 230 may perform the mitigation action to block undesirable operation of the IED 230 caused by the change in the data. In some embodiments, the mitigation action may include sending a notification to a user to inform the user that the IED 230 has detected a discrepancy in integrity check values associated with copies of the same data. The user may therefore perform an inspection, a maintenance, and/or any other suitable action to address data being changed during transmission by the device. In additional or alternative embodiments, the mitigation action may include blocking receipt and/or processing of data transmitted by the device. Thus, the IED 230 may not operate based on the data received from the device, such as until data is no longer being changed during transmission by the device.

In certain embodiments, the IED 230 may perform the method 270 each time the IED 230 receives data. Thus, the IED 230 may continually determine whether copies of received data are being changed during transmission. In additional or alternative embodiments, the IED 230 may perform the method 270 at a different frequency, such as at scheduled times during operation of the IED 230 and/or in response to a user input. Indeed, the IED 230 may perform the method 270 at any suitable time, including repeating performance of any of the procedures associated with the method 270 during operation of the IED 230. Furthermore, the method 270 may be independently performed by any combination of devices of the electric power delivery system 100, such as multiple IEDs, to improve performance of the electric power delivery system 100.

While specific embodiments and applications of the disclosure have been illustrated and described, it is to be understood that the disclosure is not limited to the precise configurations and components disclosed herein. For example, the systems and methods described herein may be applied to an industrial electric power delivery system or an electric power delivery system implemented in a boat or oil platform that may or may not include long-distance transmission of high-voltage power. Accordingly, many changes may be made to the details of the above-described embodiments without departing from the underlying principles of this disclosure. The scope of the present disclosure should, therefore, be determined only by the following claims.

Indeed, the embodiments set forth in the present disclosure may be susceptible to various modifications and alternative forms, specific embodiments have been shown by way of example in the drawings and have been described in detail herein. However, it may be understood that the disclosure is not intended to be limited to the particular forms disclosed. The disclosure is to cover all modifications, equivalents, and alternatives falling within the spirit and scope of the disclosure as defined by the following appended claims. In addition, the techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). For any claims containing elements designated in any other manner, however, it is intended that such elements are not to be interpreted under 35 U.S.C. 112(f).

What is claimed is:

1. An intelligent electronic device (IED) of an electric power delivery system, the IED comprising:
   processing circuitry; and
   a memory comprising instructions, wherein the instructions, when executed by the processing circuitry, are configured to cause the processing circuitry to perform operations comprising:
      receiving first data via parallel redundancy protocol (PRP);
      generating a first integrity check value using a media access control security (MACsec) integrity check function based on the first data;
      receiving second data via PRP;
      generating a second integrity check value using the MACsec integrity check function based on the second data;
      comparing the first integrity check value and the second integrity check value with one another; and
      outputting a notification in response to determining that the first integrity check value and the second integrity check value do not match one another.

2. The IED of claim 1, wherein the instructions, when executed by the processing circuitry, are configured to block operation of the IED based on the first data or the second data in response to determining that the first integrity check value and the second integrity check value do not match one another.

3. The IED of claim 1, wherein the instructions, when executed by the processing circuitry, are configured to cause the processing circuitry to perform operations comprising:
identifying a first sequence number associated with the first data;
identifying a second sequence number associated with the second data; and
comparing the first integrity check value and the second integrity check value with one another in response to determining that the first sequence number and the second sequence number match one another.

4. The IED of claim 1, comprising a first port and a second port, wherein the instructions, when executed by the processing circuitry, are configured to perform operations comprising:
receiving the first data via the first port; and
receiving the second data via the second port.

5. The IED of claim 1, wherein the instructions, when executed by the processing circuitry, are configured to cause the processing circuitry to perform operations comprising:
decrypting the first data in response to receiving the first data; and
generating the first integrity check value based on decrypted first data.

6. The IED of claim 1, wherein the instructions, when executed by the processing circuitry, are configured to cause the processing circuitry to perform operations comprising:
receiving the first data and the second data from an additional IED of the electric power delivery system; and
blocking receipt of subsequent data from the additional IED in response to determining that the first integrity check value and the second integrity check value do not match one another.

7. The IED of claim 1, wherein the instructions, when executed by the processing circuitry, are configured to cause the processing circuitry to block output of the notification in response to determining that the first integrity check value and the second integrity check value match one another.

8. A non-transitory computer-readable medium comprising instructions, wherein the instructions, when executed by processing circuitry, are configured to cause the processing circuitry to perform operations comprising:
generating a first media access control security (MACsec) integrity check value based on first data received from an intelligent electronic device (TED) of an electric power delivery system via parallel redundancy protocol (PRP);
generating a second MACsec integrity check value based on second data received from the IED via PRP; and
outputting a notification in response to a determination that the first MACsec integrity check value and the second MACsec integrity check value do not match one another.

9. The non-transitory computer-readable medium of claim 8, wherein the instructions, when executed by the processing circuitry, are configured to cause the processing circuitry to perform operations comprising:
generating the first MACsec integrity check value based on information included in the first data via a MACsec function; and
generating the second MACsec integrity check value based on information included in the second data via the MACsec function.

10. The non-transitory computer-readable medium of claim 9, wherein the instructions, when executed by the processing circuitry, are configured to cause the processing circuitry to perform operations comprising encrypting third data via the MACsec function.

11. The non-transitory computer-readable medium of claim 8, wherein the instructions, when executed by the processing circuitry, are configured to cause the processing circuitry to perform operations comprising:
updating a table to associate the first MACsec integrity check value with the first data in response to generating the first MACsec integrity check value based on first data;
updating the table to associate the second MACsec integrity check value with the second data in response to generating the second MACsec integrity check value based on the second data; and
referencing the table to compare the first MACsec integrity check value and the second MACsec integrity check value with one another.

12. The non-transitory computer-readable medium of claim 11, wherein the instructions, when executed by the processing circuitry, are configured to cause the processing circuitry to perform operations comprising:
identifying a first sequence number associated with the first data;
updating the table to associate the first data with the first sequence number;
identifying a second sequence number associated with the second data;
updating the table to associate the second data with the second sequence number; and
referencing the table to compare the first MACsec integrity check value and the second MACsec integrity check value with one another in response to determining that the first sequence number and the second sequence number match one another.

13. The non-transitory computer-readable medium of claim 8, wherein the instructions, when executed by the processing circuitry, are configured to cause the processing circuitry to perform operations comprising:
receiving a connectivity association key (CAK) via an adoption link established with the IED;
establishing a MACsec key agreement (MKA) connectivity association with the IED in response to verification of a possession of the CAK by the IED;
receiving a security association key (SAK) via the MKA connectivity association; and
communicating data with the IED using the SAK.

14. The non-transitory computer-readable medium of claim 13, wherein the instructions, when executed by the processing circuitry, are configured to cause the processing circuitry to perform operations comprising:
using the SAK to decrypt the first data, the second data, or both;
generating the first MACsec integrity check value based on the first data upon using the SAK to decrypt the first data; and
generating the second MACsec integrity check value based on the second data upon using the SAK to decrypt the second data.

15. An intelligent electronic device (TED) of an electric power delivery system, the IED comprising:

media access control security (MACsec) control circuitry configured to perform operations comprising:
  receiving first data;
  generating a first integrity check value for the first data;
  receiving second data; and
  generating a second integrity check value for the second data; and
parallel redundancy protocol (PRP) control circuitry configured to perform operations comprising:
  receiving the first data;
  identifying the first integrity check value generated for the first data;
  receiving the second data;
  identifying the second integrity check value generated for the second data; and
  outputting a notification in response to determining that the first integrity check value and the second integrity check value do not match one another.

16. The IED of claim 15, comprising protocol circuitry, wherein the PRP control circuitry is configured to forward the first data to the protocol circuitry, and the protocol circuitry is configured to cause operation of the IED based on the first data.

17. The IED of claim 16, wherein the first data comprises a first redundancy check trailer comprising a first sequence number, the second data comprises a second redundancy check trailer comprising a second sequence number, and the PRP control circuitry is configured to perform operations comprising:
  determining that the first sequence number and the second sequence number match one another; and
  blocking the second data from being received by the protocol control circuitry in response to forwarding the first data to the protocol control circuitry and determining that the first sequence number and the second sequence number match one another.

18. The IED of claim 17, wherein the PRP control circuitry is configured to perform operations comprising:
  updating a table to associate the first integrity check value and the first sequence number with the first data in response to receiving the first data;
  updating the table to associate the second integrity check value and the second sequence number with the second data in response to receiving the second data;
  referencing the table to compare the first sequence number and the second sequence number with one another; and
  referencing the table to compare the first integrity check value and the second integrity check value with one another in response to determining that the first sequence number and the second sequence number match one another.

19. The IED of claim 15, wherein the MACsec control circuitry is configured to perform operations comprising:
  encrypting the first data, the second data, or both;
  generating the first integrity check value for the first data after encryption of the first data; and
  generating the second integrity check value for the second data after encryption of the second data.

20. The IED of claim 15, wherein the MACsec control circuitry is implemented in a physical layer of the IED.

* * * * *